L. MILLER.
MACHINE FOR MAKING CORES.
APPLICATION FILED JUNE 4, 1919.
1,329,425.
Patented Feb. 3, 1920.
5 SHEETS—SHEET 1.
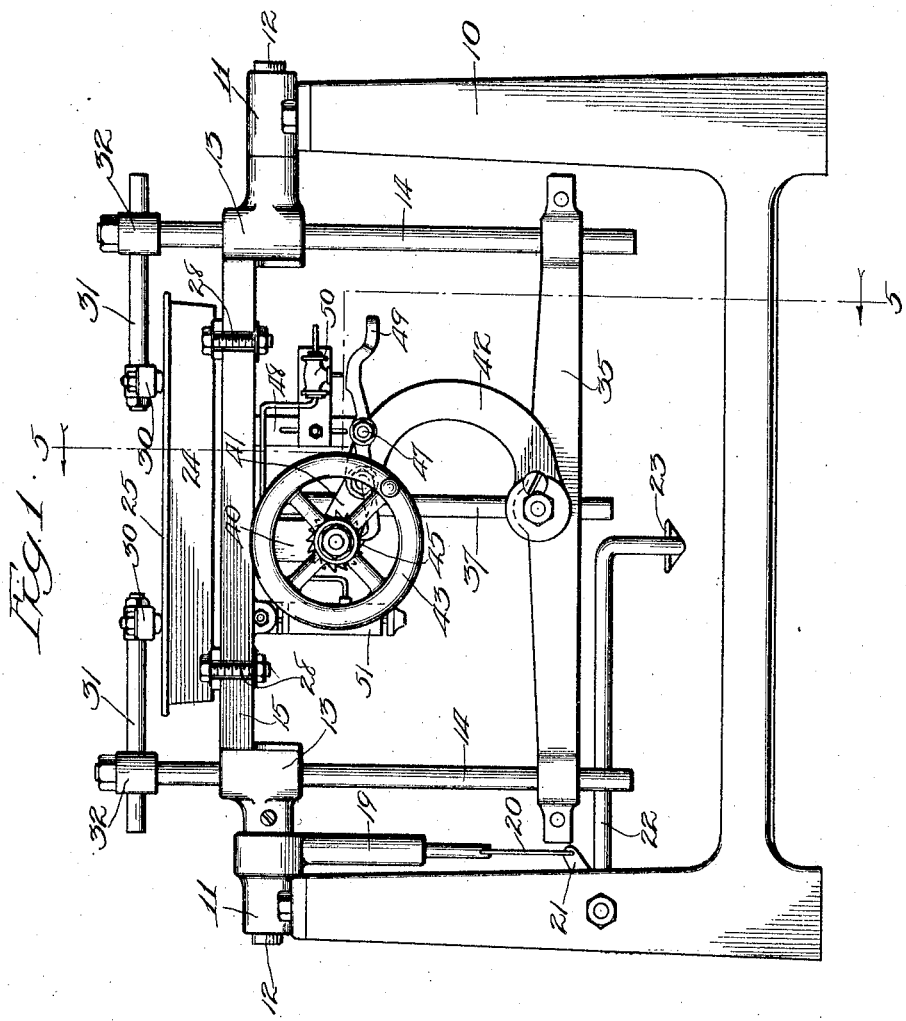
Witness:
Harry S. Gaither
Inventor:
Leon Miller

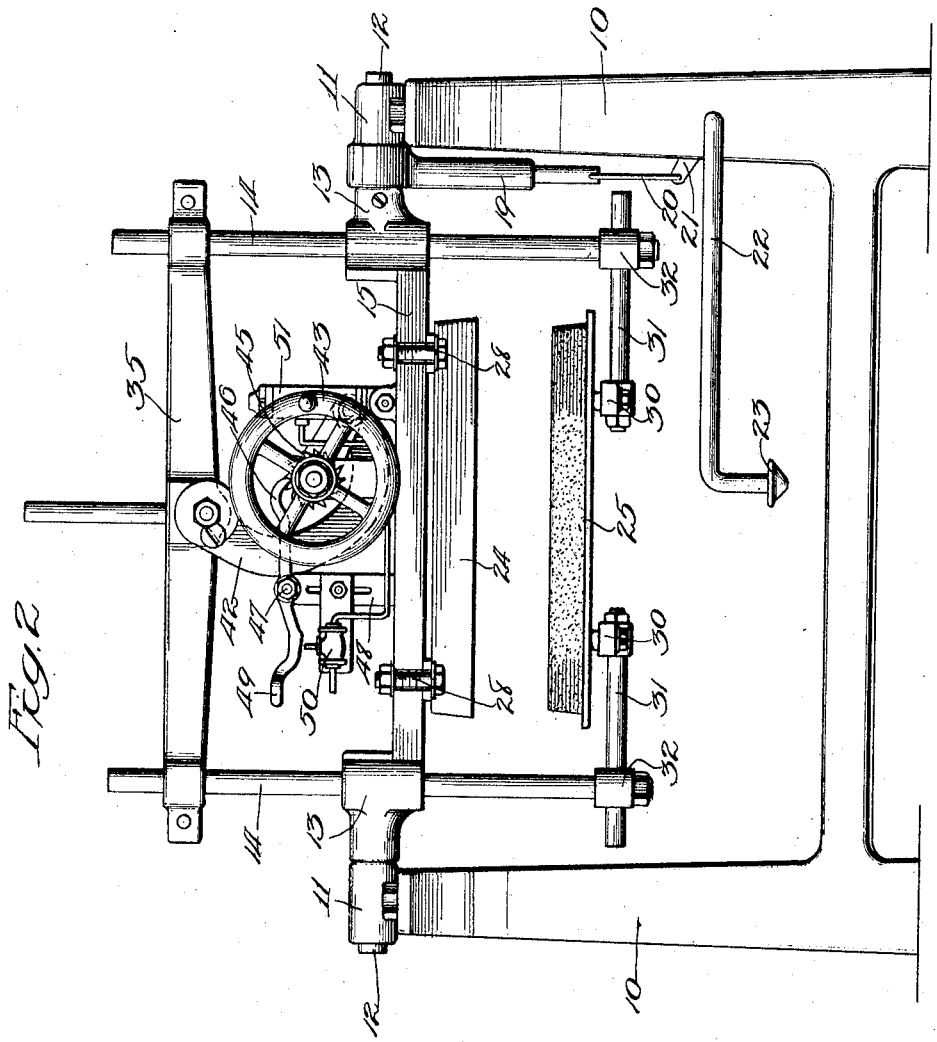

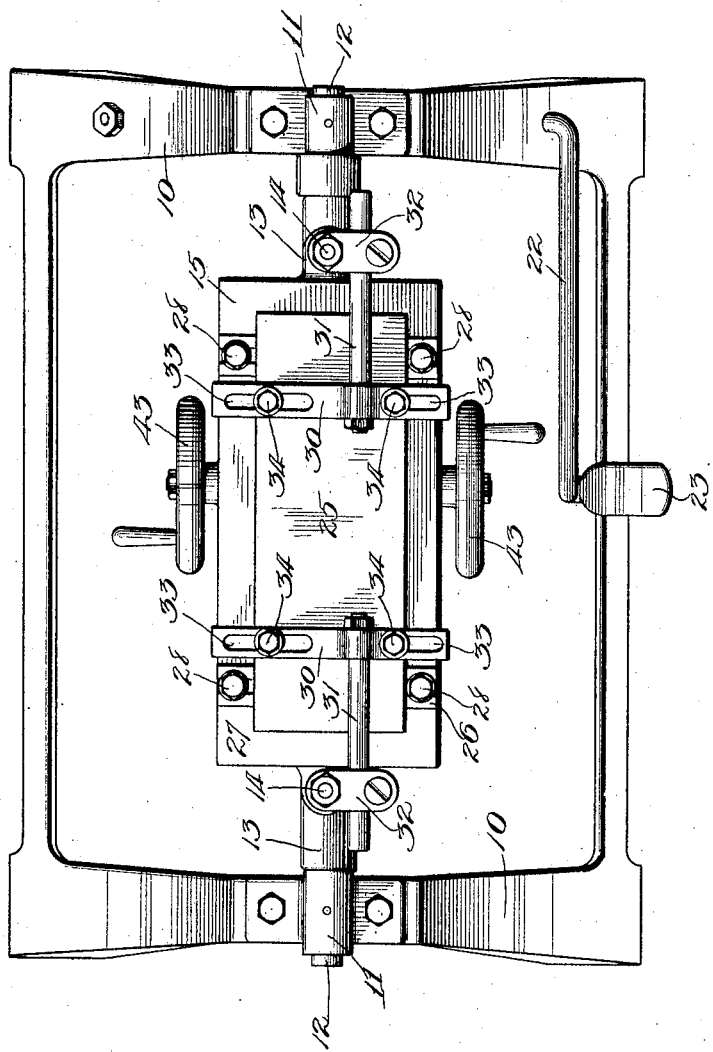

L. MILLER.
MACHINE FOR MAKING CORES.
APPLICATION FILED JUNE 4, 1919.
1,329,425.
Patented Feb. 3, 1920.
5 SHEETS—SHEET 4.
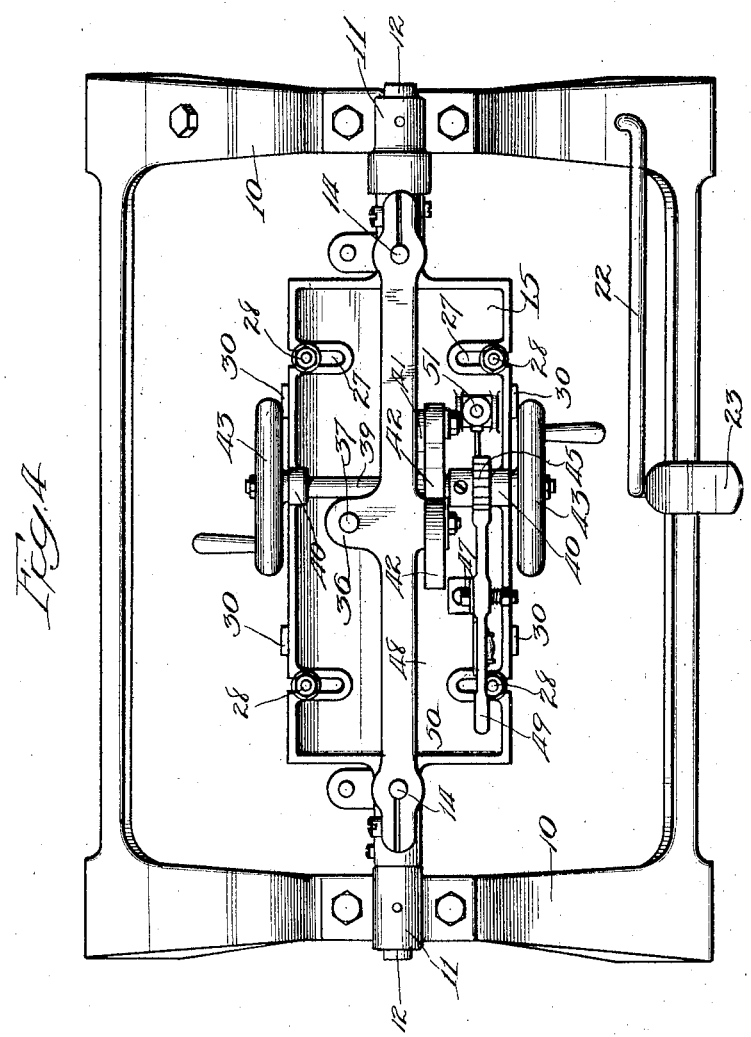

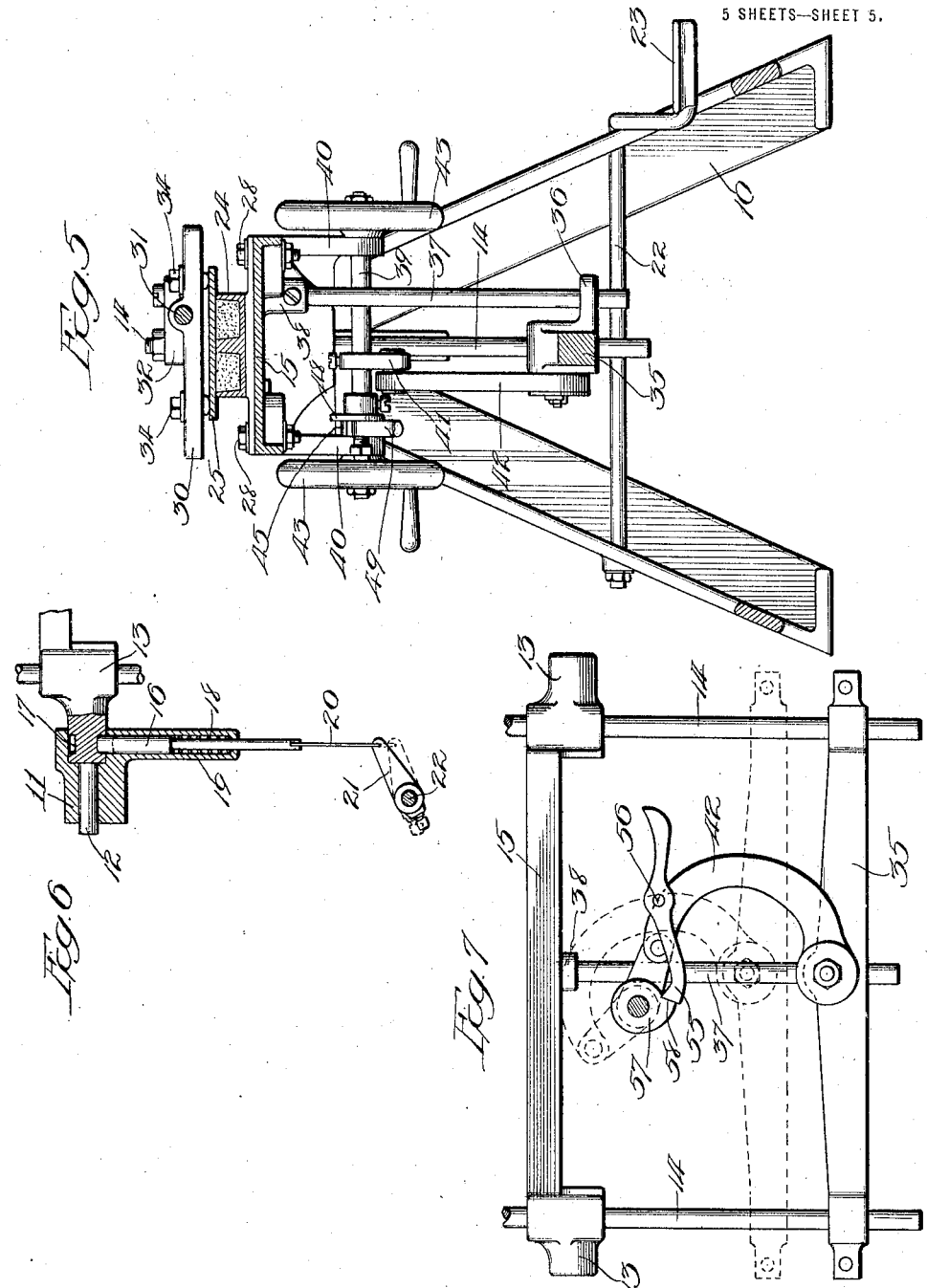

UNITED STATES PATENT OFFICE.

LEON MILLER, OF MOLINE, ILLINOIS.

MACHINE FOR MAKING CORES.

1,329,425. Specification of Letters Patent. Patented Feb. 3, 1920.

Application filed June 4, 1919. Serial No. 301,745.

*To all whom it may concern:*

Be it known that I, LEON MILLER, a citizen of the United States, residing at Moline, in the county of Rock Island and State of Illinois, have invented certain new and useful Improvements in Machines for Making Cores, of which the following is a specification.

This invention is concerned with a machine such as is adapted to foundry use for the making of cores; and the improvements distinguishing this machine will be readily understood from the following description, taken in connection with the accompanying drawings, in which—

Figure 1 is a rear elevation of a mechanism exemplifying my invention, the rotatable bed being turned to present the core box upwardly; Fig. 2, a front elevation showing the bed turned over with the core box thereon inverted; Fig. 3, a plan view with the parts related as in Fig. 1; Fig. 4, a similar view with the parts related as in Fig. 2; Fig. 5, a transverse view taken on line 5—5 of Fig. 1; Fig. 6, a detail, partly in section, of the stop device for the bed; and Fig. 7, a detail in elevation exhibiting a modification of certain of the operating parts.

In the drawings 10 designates a frame having at each of its opposite ends a bearing 11 in which is rotatably journaled a trunnion 12 projected from a guide 13 which receives therein a slidable post 14, the two guides being formed adjacent opposite ends of a bed 15. Means for locking the bed in a horizontal plane are provided in a pin 16 (see Fig. 6) adapted to seat within either of two notches 17 formed 180° apart in one of the trunnions 12, a spring 18 normally urging the pin to its seat; a tubular casing 19 protects the spring and pin, the latter being extended to connect with a link 20 which is pivoted to a crank 21 adjustably secured to an oscillatable rod 22 suitably bent in crank form, as shown in Fig. 5, to carry a pedal 23 for foot operation. By depressing the pedal the pin 16 is disengaged from the notch permitting the bed 15 to be turned in either direction through an arc of 180°, its movement being then arrested by reëngagement of the pin with the opposite notch under the influence of the spring.

Upon the upper side of the bed 15 may be placed a core box 24 having a plate 25 for covering and other purposes. As a simple means of securing the box upon the bed, the former may be equipped with lugs 26 (see Fig. 3) each slotted to register with other slots 27 extending inwardly from opposite sides of the bed so as to receive bolts 28 whose heads abut the bed, and which may be tightened in place by screwing down their nuts against the lugs 26. The fastening means suggested assures that the core box will remain securely in place upon the bed in all its rotary positions.

A means of clamping the plate 25 upon the core box is also provided, which, in the preferred form, consists of two bars 30 each carried upon an arm 31 which is adjustably held within a bracket 32 upon one of the two slidable posts 14; each bar which is normally disposed transversely to the core box in a horizontal plane is secured intermediate its ends to its respective arm 31, and is formed with slots 33 lengthwise of itself, one toward each end. Slidably arranged within each slot 33 is a bolt 34 having means for being tightened in place in a selected position of adjustment, the heads of these four bolts 34 being adapted to contact with the face of the plate 25. At this point it should be noted that the core box may be secured upon the bed in a selected position of adjustment and the bolts 34 may be adjusted lengthwise of the bars 30 which in turn may be shifted endwise of the arms 31 which also may be angularly turned either about a vertical or a horizontal axis, the purpose of these various adjustments being to place the heads of the four bolts 34 squarely upon the plate 25 when resting upon the core box 24.

The two posts 14 which are slidably arranged within the guides 13 have their lower ends adjustably connected to a cross bar 35 provided intermediate its ends with a guide 36 (see Fig. 5) within which is a post 37 having one end secured within a boss 38 on the under side of the bed 15; and adjacent the post in transverse relation to the machine is a shaft 39 rotatably carried upon two brackets 40 depending from the under side of the bed, a crank 41 being mounted upon the shaft and connecting with the cross bar 35 as by means of a link 42 which is preferably bowed in the manner best shown in Fig. 7. Hand wheels 43 are mounted on the shaft 39, one at each end thereof, and either adapted for convenient operation. It should be obvious that through manipulation of either hand wheel the cross bar 35 is moved toward and from the bed, this movement affecting similarly the bolts 34 which are carried upon the parallel bars 30 on the opposite side of the bed, the effect being to apply or remove pressure relative to the plate when seated upon the core box, through an assured straight-line movement.

I have also arranged a means for maintaining the plate tightly upon the core box during inversion thereof comprising, by preference, a ratchet wheel 45 locked to the shaft 39 and engageable by a spring actuated dog 46 in the form of a lever that is pivoted as at 47 upon a bracket 48 carried beneath the bed 15. The handle end 49 of this lever may be located in operative relation to the valve 50 of a pneumatic vibrating device 51 carried upon the under side of the bed, the arrangement being such that operation of the handle 49 preliminary to movement of the hand wheel will cause the vibrator to function so as to loosen the sand from the walls forming the molds with the core box. As shown, this valve 50 may be adjustably held upon the bracket 48 so as to occupy a desired operative relation to the dog 46.

A modified construction of the dog and ratchet is exhibited in Fig. 7 in which the parts identical with the constructions shown in the other figures are given like numerals. The dog, however, designated as 55 is pivoted as at 56 to a suitable support not shown, so as to present its acting end to a member 57 in the nature of a cam having a tooth 58 adapted to coöperate with the dog. The cam construction in Fig. 7 provides a single tooth, and in this respect only is dissimilar from the ratchet wheel construction elsewhere shown.

In the use of the present machine, the bed is turned right side up with a core box secured thereto in the manner already explained. After molding the sand the covering plate is applied in place, and one of the hand wheels is operated to apply pressure thereto through the medium of the parallel bars 30 which previously have been adjusted for this purpose. While thus positioned, the pedal is depressed to permit an inversion of the entire bed following which the dog is disengaged from the ratchet wheel, the vibrator being simultaneously operated, allowing the attendant to reverse the hand wheel so as to withdraw pressure from the plate, by which action the plate with molds thereon is disengaged from the core box (see Fig. 2). The plate is next taken off of the parallel bars and removed with the cores to the baking oven. This completes the operation of the machine which is now ready to be used over again as soon as the bed is turned right side up. These various steps may all be carried on from the front side of the machine where the pedal 23 is located; one hand wheel 43 is always presented to the operator on this side, so that the movements of the parts coöperating with the plate upon the core box are accomplished with ease.

It is to be noted that the present machine is essentially simple in its construction and operation. I have provided for all adjustments that are required to adapt the machine for use with core boxes varying greatly in size and character, and have employed the principle of a straight-line movement toward and from the core box such as to assure a faultless removal of the cores therefrom. In this machine, I have avoided the use of delicate parts that tend to become impaired through contact with sand, utilizing only a rugged and substantial construction such as is especially fitted to conditions obtaining in a foundry.

I claim:

1. In a machine of the kind described, the combination of a frame on which is mounted a rotatable bed, means for holding the bed horizontally in either upright or inverted position, means for securing to the bed a core box adapted to be covered by a plate, and means for applying pressure to the plate, having plural contact points self-adjusting to the plane of the plate, whereby the plate is firmly held upon the core box, said pressure means operating always in an assured straight-line direction toward the core box, substantially as described.

2. In a machine of the kind described, the combination of a frame on which is mounted a rotatable bed, means for securing to the bed in a selected position thereupon a core box adapted to be covered by a removable plate, and means for applying pressure upon the plate in a direction straight toward and from the bed, said means being operable during rotary movements of the bed and acting to support the plate at a point remote from the core box when the bed is inverted, substantially as described.

3. In a machine of the kind described, the combination of a frame on which is mounted a rotatable bed, means for securing to the bed a core box adapted to be covered by a removable plate, said means consisting of slotted lugs projected laterally from the core box in register with other slots formed in the bed, and an element coöperating with each extended through each pair of registering slots for tightening the core box in place, and means for applying to the plate a variable degree of pressure, said means operating also as a support for the plate when the core box and bed is inverted, substantially as described.

4. In a machine of the kind described, the combination of a frame on which is mounted a rotatable bed, means for securing to the bed a core box adapted to be covered by a removable plate, means for applying to different points of the plate an equal degree of pressure operable by other means located on the side of the bed opposite to that on which the core box is secured, said operating means being adapted for actuation from either the front or rear side of the bed, substantially as described.

5. In a machine of the kind described, the combination of a frame on which is mounted a rotatable bed, means for securing to the bed a core box adapted to be covered by a removable plate, a pair of posts slidably journaled in the bed having a connecting bar on the side of the bed remote from the core box, an arm secured to each post, adjustable lengthwise and laterally thereof, and a bar swingingly secured to each arm having contact points arranged to engage with the plate, and means secured to the bed upon the side remote from the core box having connection with the bar for moving the two posts in unison whereby the contact points engaging with the plate are brought nearer thereto or farther therefrom as desired, substantially as described.

6. In a machine of the kind described, the combination of a frame on which is mounted a rotatable bed, means for securing to the bed a core box adapted to be covered by a removable plate, and means movable toward and from the plate for applying thereto a variable degree of pressure consisting of posts journaled to slide within the bed, arms projected from each post in overlying relation to the plate, bars carried by each arm having contact points in engagement with the plate, a connecting bar between the posts on the side of the bed remote from the core box, a link connected with said bar, a crank connected to the link, a rotatable shaft on which the crank is mounted, a pair of hand wheels, one on each end of the shaft and either adapted for manual operation, and means coöperating with the shaft for holding the same against reverse movement when the parts have been operated to apply to the plate a desired degree of pressure, said means being movable at will to permit reverse movement of the parts, substantially as described.

7. In a machine of the kind described, the combination of a frame on which is mounted a rotatable bed, means for securing to the bed in a selected position thereupon, a core box adapted to be covered by a removable plate, means for holding the bed horizontally in either upright or inverted position, and means for guiding in a vertical direction withdrawal movements of the plate from the core box when the bed is inverted, whereby the cores within the box are transferred to the plate, substantially as described.

8. In a machine of the kind described, the combination of a frame on which is mounted a rotatable bed, means for securing to the bed a core box adapted to be covered by a removable plate, means for holding the plate upon the core box during rotary movements of the bed, means for holding the bed horizontally in inverted position, and means for guiding in a vertical direction withdrawal movements of the plate from the core box requiring preliminary operation of other means which operate a vibrator arranged in operative relation to the core box, substantially as described.

9. In a machine of the kind described, the combination of a frame on which is mounted a rotatable bed, means for securing to the bed a core box adapted to be covered by a removable plate, means for holding the plate upon the core box, operating, when the bed is inverted, to withdraw the plate therefrom, said means being adapted for manual operation by a hand wheel secured to a shaft having a ratchet wheel engaged by a spring actuated dog, all mounted on the bed, for preventing reverse movement of the shaft, the shaft having operative connection with the plate holding means, substantially as described.

10. In a machine of the kind described, the combination of a frame, a bed, a guide at each end of the bed from which projects a trunion that is journaled within the frame, a sliding post in each guide, a connection between said posts on one side of the bed, a core box secured to the opposite side of the bed and adapted to be covered by a removable plate, means carried by each post for applying pressure to the plate, and means coöperating with the connection between the posts for sliding the same endwise in unison, whereby pressure may be applied to the plate, substantially as described.

11. In a machine of the kind described, the combination of a frame, a bed, trunnions extended from the bed journaled within the frame, a casing extended from the journal in which is a spring actuated locking pin adapted to seat within either of two recesses formed in the trunnion 180° apart, whereby the bed is maintained horizontally in either upright or inverted position, pedal mechanism connected with the pin for withdrawing the same whereby the bed may then be rotated, a core box secured to the bed, and means for holding a plate upon the core box during rotary movements of the bed, said means operating also to withdraw the plate in a straight-line movement from the core box when the bed is inverted, substantially as described.

12. In a machine of the kind described, the combination of a frame on which is mounted a rotatable bed, a sand container adjustably mounted on the bed, and means carried by the bed operable during rotary movements thereof for applying pressure to the sand and for equalizing pressure so applied to different parts of the sand, substantially as described.

LEON MILLER.

Witness:
W. PARSONS.